US012654570B2

(12) United States Patent
Kong et al.

(10) Patent No.: US 12,654,570 B2
(45) Date of Patent: Jun. 16, 2026

(54) DRIVE APPARATUS AND ELECTRIC VEHICLE

(71) Applicant: Huawei Digital Power Technologies Co., Ltd., Shenzhen (CN)

(72) Inventors: Xuejuan Kong, Dongguan (CN); Ningbo Feng, Dongguan (CN); Xing Zhang, Dongguan (CN)

(73) Assignee: HUAWEI DIGITAL POWER TECHNOLOGIES CO., LTD., Shenzhen (CN)

( * ) Notice: Subject to any disclaimer, the term of this patent is extended or adjusted under 35 U.S.C. 154(b) by 51 days.

(21) Appl. No.: 18/938,884

(22) Filed: Nov. 6, 2024

(65) Prior Publication Data

US 2025/0058652 A1 Feb. 20, 2025

Related U.S. Application Data

(63) Continuation of application No. PCT/CN2022/091199, filed on May 6, 2022.

(51) Int. Cl.
| | |
|---|---|
| *B60L 50/51* | (2019.01) |
| *B60L 50/60* | (2019.01) |
| *B60R 16/023* | (2006.01) |
| *H02K 11/33* | (2016.01) |

(52) U.S. Cl.
CPC .............. *B60L 50/51* (2019.02); *B60L 50/60* (2019.02); *B60R 16/0232* (2013.01); *H02K 11/33* (2016.01); *B60L 2210/42* (2013.01); *B60L 2240/423* (2013.01); *B60L 2240/463* (2013.01); *B60L 2240/526* (2013.01)

(58) Field of Classification Search
None
See application file for complete search history.

(56) References Cited

U.S. PATENT DOCUMENTS

| | | | |
|---|---|---|---|
| 9,577,569 B2 | 2/2017 | Guo et al. | |
| 2017/0284013 A1* | 10/2017 | Peterson | ................... H02P 1/44 |
| 2019/0252970 A1* | 8/2019 | Ohdaira | ................... H02M 1/32 |
| 2020/0272481 A1* | 8/2020 | Oishi | ................... G06F 11/3082 |
| 2020/0350903 A1 | 11/2020 | Gu et al. | |
| 2023/0057969 A1* | 2/2023 | Im | ................... B61L 15/0072 |

FOREIGN PATENT DOCUMENTS

| | | |
|---|---|---|
| CN | 105449638 B | 10/2017 |
| CN | 108565839 A | 9/2018 |
| CN | 108681318 A | 10/2018 |
| CN | 112297877 A | 2/2021 |

* cited by examiner

*Primary Examiner* — James J Lee
*Assistant Examiner* — Jonathan E Reinert
(74) *Attorney, Agent, or Firm* — Conley Rose, P.C.

(57) ABSTRACT

A drive apparatus includes a control chip, a watchdog chip, a drive logic circuit, and a plurality of drive chips. The control chip is connected to the watchdog chip and the drive logic circuit, and is configured to determine a PWM signal of each switch and output the PWM and a first signal to the drive logic circuit. The watchdog chip is connected to the drive logic circuit, and is configured to send a second signal. The first and the second pin of the drive chip are connected to the drive logic circuit. The third pin is configured to connect to a corresponding switch, and adjust a drive signal of the connected switch based on the received drive control signal and the received enable signal generated by the drive logic circuit.

20 Claims, 8 Drawing Sheets

DRIVE APPARATUS AND ELECTRIC VEHICLE

CROSS-REFERENCE TO RELATED APPLICATIONS

This is a continuation of Int'l Patent App. No. PCT/CN2022/091199, filed on May 6, 2022, which is incorporated by reference.

FIELD

This disclosure relates to the field of electric vehicle technologies, and in particular, to a drive apparatus and an electric vehicle.

BACKGROUND

An electric vehicle mainly includes a wheel, a motor, a drive apparatus, and an inverter. The motor is connected to the inverter, and may obtain electric energy from the inverter, convert the electric energy into mechanical energy, and output drive torque used to drive the electric vehicle to travel. The drive apparatus is connected to the inverter, and may provide drive signals for a plurality of switches in the inverter, to control operation of the motor. In actual use, safety of the drive torque is one of important functional safety objectives of the electric vehicle. As a requirement for functional safety of the electric vehicle is increasing high, the drive apparatus needs to meet a specific safety level, to ensure travelling safety of the electric vehicle.

As shown in FIG. 1, a watchdog chip, a control chip, and a drive circuit are disposed in the drive apparatus, and the drive circuit includes a plurality of drive chips. To meet a safety level requirement of the electric vehicle on the drive apparatus, a plurality of components disposed in the drive apparatus all are components with a specific safety level, and these components with the specific safety level may form three turn-off paths of the drive torque output by the motor. A first turn-off path may be implemented by using a pin that is in a drive chip and that is configured to receive a pulse-width modulation (PWM) signal. A second turn-off path and a third turn-off path may be implemented by using other two pins in the drive chip, and the two pins are respectively connected to specific functional circuits in the drive chip.

In actual application, the inverter includes a plurality of bridge arms, each bridge arm includes at least two switches, and each switch needs to be configured with a drive chip configured to provide a drive signal. To meet the safety level requirement on the drive apparatus, drive chips configured for a plurality of switch components in the inverter all are drive chips with a high safety level. If a vehicle regulation drive chip without a safety level is used, because the vehicle regulation drive chip does not have functional circuits corresponding to the second turn-off path and the third turn-off path in the drive chip with a high safety level, when the drive apparatus uses the vehicle regulation drive chip, drive torque cannot be stopped through the second turn-off path and the third turn-off path. As a result, the electric vehicle may be in an out-of-control state.

In view of this, the drive apparatus of the electric vehicle needs to be further studied.

SUMMARY

This disclosure provides a drive apparatus and an electric vehicle, to meet a safety level requirement of the drive apparatus when a vehicle regulation drive chip is used.

According to a first aspect, a drive apparatus may be used in an electric vehicle. The electric vehicle includes a motor, an inverter configured to supply power to the motor, and the drive apparatus configured to provide a drive signal for a switch in the inverter.

The drive apparatus includes a control chip, a watchdog chip, a drive logic circuit, and a plurality of drive chips. The plurality of drive chips one-to-one correspond to a plurality of switches in the inverter.

Specifically, the control chip is connected to the watchdog chip and the drive logic circuit, and is configured to: receive an operation parameter of the motor, generate drive torque based on the operation parameter, determine a pulse width modulation PWM signal of each switch in the inverter based on the drive torque, output the PWM signal of each switch to the drive logic circuit, and when determining that the drive torque is abnormal or the operation parameter exceeds a specified range, send, to the drive logic circuit, a first signal representing that the torque is abnormal or the motor operates abnormally. The watchdog chip is connected to the drive logic circuit, and is configured to: perform fault monitoring on the control chip, and when determining that the control chip is faulty, send, to the drive logic circuit, a second signal representing that the control chip is faulty. The drive logic circuit is connected to the plurality of drive chips, and is configured to: generate a drive control signal and an enable signal of each switch based on the signals sent by the watchdog chip and the control chip, and separately output the drive control signal and the enable signal of each switch to a drive chip corresponding to the switch. Each drive chip is provided with a first pin, a second pin, and a third pin. Both the first pin and the second pin are connected to the drive logic circuit, the third pin is configured to be connected to the switch corresponding to the drive chip, and the drive chip is configured to: receive the drive control signal of the corresponding switch through the first pin, receive the enable signal of the corresponding switch through the second pin, and adjust, based on the received drive control signal and the received enable signal, a drive signal output to the connected switch.

In the foregoing drive apparatus, signals on three turn-off paths of the drive torque all need to be sent to the drive logic circuit, and the drive logic circuit may generate, based on the signals on the three turn-off paths, an enable signal output to an enable pin of a drive chip, and generate a drive control signal output to a PWM signal receiving pin of the drive chip. In this case, when drive torque on any one of the three turn-off paths needs to be stopped, the drive logic circuit outputs a corresponding signal, and adjusts a drive signal output by a drive chip to control the drive torque output by a turn-off circuit. In this case, a pin occupied by the drive chip is a functional pin that is included in both a vehicle regulation drive signal and a drive chip with a specific safety level. Therefore, drive torque of the three turn-off paths can be stopped by using the vehicle regulation drive chip, to meet a safety level requirement of the drive apparatus.

In a possible implementation, the first signal includes an upper bridge turn-off signal, an upper bridge turn-off enable signal, a lower bridge turn-off signal, or a lower bridge turn-off enable signal. In actual application, when the drive torque is abnormal or the operation parameter exceeds the specified range, the control chip may send signals for separately controlling switches in an upper bridge arm and a lower bridge arm.

In a possible implementation, the drive logic circuit includes an upper bridge drive logic circuit and a lower bridge drive logic circuit.

The upper bridge drive logic circuit is connected to a drive chip corresponding to a switch in an upper bridge arm in the inverter, and is configured to: generate a drive control signal and an enable signal of each switch in the upper bridge arm in the inverter based on the signals sent by the watchdog chip and the control chip, and output the drive control signal and the enable signal of each switch to the drive chip corresponding to the switch. The lower bridge drive logic circuit is connected to a drive chip corresponding to a switch in a lower bridge arm in the inverter, and is configured to: generate a drive control signal and an enable signal of each switch in the lower bridge arm in the inverter based on the signals sent by the watchdog chip and the control chip, and output the drive control signal and the enable signal of each switch to the drive chip corresponding to the switch.

In the foregoing drive apparatus, states of switches in the upper bridge arm and the lower bridge arm in the inverter are mostly complementary, and when a drive signal is not provided for a switch in the lower bridge arm or for a switch in the upper bridge arm, the drive torque output by the motor can also be stopped. Therefore, the switch in the upper bridge arm and the switch in the lower bridge arm in the inverter can be controlled separately.

In a possible implementation, the upper bridge drive logic circuit is further configured to: generate the enable signal of each switch in the upper bridge arm in response to the received second signal or the received upper bridge enable signal, determine the drive control signal of each switch in the upper bridge arm based on the received second signal, the upper bridge turn-off signal, and a PWM signal of the switch in the upper bridge arm, and output the drive control signal of each switch to the drive chip corresponding to the switch.

In a possible implementation, the lower bridge drive logic circuit is further configured to: generate the enable signal of each switch in the lower bridge arm in response to the received second signal or the received lower bridge turn-off signal, determine the drive control signal of each switch in the lower bridge arm based on the received second signal, the lower bridge turn-off signal, and a PWM signal of the switch in the lower bridge arm, and output the drive control signal of each switch to the drive chip corresponding to the switch.

In a possible implementation, the upper bridge drive logic circuit includes a plurality of first logic circuits. Each of the first logic circuits one-to-one corresponds to each switch in the upper bridge arm. The lower bridge drive logic circuit includes a plurality of second logic circuits. Each of the second logic circuits one-to-one corresponds to each switch in the lower bridge arm.

The first logic circuit is connected to the watchdog chip and the control chip, and the first logic circuit is configured to: be connected to a drive chip to which a corresponding switch is connected, generate, based on the signals sent by the watchdog chip and the control chip, a drive control signal and an enable signal of the corresponding switch, and output the drive control signal and the enable signal to the connected drive chip. The second logic circuit is connected to the watchdog chip and the control chip. The second logic circuit is configured to: be connected to a drive chip to which a corresponding switch is connected, generate, based on the signals sent by the watchdog chip and the control chip, a drive control enable signal of the corresponding switch, and output the drive control enable signal to the connected drive chip.

In the foregoing drive apparatus, when the inverter in the electric vehicle is a three-phase inverter, the inverter may include three bridge arms, and a difference between phases of alternating currents generated by bridge arms is 120°, and corresponding turn-on and turn-off time sequences of each switch are different. To accurately control operation of the electric vehicle, each switch may be independently controlled by using the first logic circuit and the second logic circuit.

In a possible implementation, the upper bridge drive logic circuit includes a first AND gate circuit, a second AND gate circuit, a first OR gate circuit, a second OR gate circuit, and a third OR gate circuit.

A first input end of the first AND gate circuit is connected to the control chip, a second input end of the first AND gate circuit is connected to the watchdog chip, and an output end of the first AND gate circuit is connected to a second pin of a drive chip connected to the upper bridge drive logic circuit. A first input end of the second AND gate circuit is connected to the control chip, a second input end of the second AND gate circuit is connected to the watchdog chip, and an output end of the second AND gate circuit is separately connected to a first input end of the first OR gate circuit, a first input end of the second OR gate circuit, and a first input end of the third OR gate circuit. A second input end of the first OR gate circuit is connected to the control chip, and an output end of the first OR gate circuit is connected to a first pin of a drive chip connected to a first switch in the upper bridge arm. A second input end of the second OR gate circuit is connected to the control chip, and an output end of the second OR gate circuit is connected to a first pin of a drive chip connected to the second switch in the upper bridge arm. A second input end of the third OR gate circuit is connected to the control chip, and an output end of the third OR gate circuit is connected to a first pin of a drive chip connected to a third switch in the upper bridge arm.

In a possible implementation, the lower bridge drive logic circuit includes a first phase inverter, a third AND gate circuit, a fourth OR gate circuit, a fifth OR gate circuit, a sixth OR gate circuit, a seventh OR gate circuit, and an eighth OR gate circuit.

A first input end of the first phase inverter is connected to the watchdog chip, and an output end of the first phase inverter is connected to a first input end of the fourth OR gate circuit. A second input end of the fourth OR gate circuit is connected to the control chip, and an output end of the fourth OR gate circuit is connected to a second pin of a drive chip connected to the lower bridge drive logic circuit. A first input end of the third AND gate circuit is connected to the control chip, a second input end of the third AND gate circuit is connected to the watchdog chip, and an input end of the third AND gate circuit is connected to a first input end of the fifth OR gate circuit. A second input end of the fifth OR gate circuit is connected to the output end of the first phase inverter, and an input end of the fifth OR gate circuit is separately connected to a first input end of the sixth OR gate circuit, a first input end of the seventh OR gate circuit, and a first input end of the eighth OR gate circuit. A second input end of the sixth OR gate circuit is connected to the control chip, and an output end of the sixth OR gate circuit is connected to a first pin of a drive chip connected to a first switch in the lower bridge arm. A second input end of the seventh OR gate circuit is connected to the control chip, and an output end of the seventh OR gate circuit is connected to a first pin of a drive chip connected to a second switch in the lower bridge arm. A second input end of the eighth OR gate circuit is connected to the control chip, and an output end of the eighth OR gate circuit is connected to a first pin of a drive chip connected to a third switch in the lower bridge arm.

In a possible implementation, the upper bridge drive logic circuit is further configured to output a third signal representing a drive state of a switch in the upper bridge arm; and the lower bridge drive logic circuit is further configured to output a fourth signal representing a drive state of a switch in the lower bridge arm.

In the foregoing drive apparatus, the state of the upper bridge arm switch and the state of the lower bridge arm switch may be determined by using the third signal and the fourth signal, and a status of supplying power to the motor by the inverter may be determined by using the foregoing signals, to determine an output status of the drive torque of the motor.

In a possible implementation, the drive apparatus further includes a turn-off path self-check circuit and a turn-off path monitoring circuit.

The turn-off path self-check circuit is configured to: when the drive apparatus is started, receive the enable signal, the third signal, and the fourth signal that are output by the drive logic circuit, and when a state of a received signal is abnormal, notify the drive logic circuit and the drive chip to turn off the drive torque output by the motor. The turn-off path monitoring circuit is configured to: receive the enable signal, the third signal, and the fourth signal, and when a state of a received signal is abnormal, notify the drive logic circuit and the drive chip to turn off the drive torque output by the motor.

In the foregoing drive apparatus, a turn-off state of drive torque of each turn-off path can be monitored during a power-on self-check process and a power-on operation process of the drive apparatus by using the turn-off path self-check circuit and the turn-off path.

In a possible implementation, the drive apparatus further includes a conversion circuit. The conversion circuit is connected to an output end of the inverter, and is configured to: convert, into a digital signal, an electrical parameter that is in an analog signal form and that is output by the output end of the inverter, and output an electrical parameter of the digital signal to the turn-off path self-check circuit. The turn-off path self-check circuit is further configured to: when the drive apparatus is started, determine, based on a preset duty cycle of a drive signal output by the drive apparatus, a specified range of the electrical parameter output by the inverter, and when the electrical parameter of the received digital signal exceeds the specified range, notify the drive logic circuit and the drive chip to turn off the drive torque output by the motor.

In the foregoing drive apparatus, in a power-on self-check process of the drive apparatus, an output voltage of the inverter may be adjusted by adjusting the duty cycle of the drive signal output by the drive apparatus. Therefore, in the power-on self-check process of the drive apparatus, a fluctuation range of the output voltage corresponding to the duty cycle in a normal case may be calculated based on the duty cycle of the drive signal output by the drive apparatus, and an operation state of the drive apparatus is determined based on a comparison result between the electrical parameter output by the conversion circuit and the fluctuation range that is of the voltage that is obtained through calculation.

In a possible implementation, the drive apparatus further includes an isolator connected between the output end of the inverter and the conversion circuit.

In the foregoing drive apparatus, the drive apparatus is a control side of the electric vehicle, namely, a low-voltage side of the electric vehicle. An output side of the inverter is a high-voltage side of the electric vehicle. To ensure safety between the low-voltage side and the high-voltage side, the isolator may be used to implement electrical isolation between the low-voltage side and the high-voltage side.

According to a second aspect, an electric vehicle includes a motor, an inverter, and the drive apparatus provided in any one of the first aspect and the designs of the first aspect.

The drive apparatus is connected to the inverter, and the drive apparatus is configured to provide a drive signal for a switch in the inverter. The inverter is connected to the motor, and the inverter supplies power to the motor after receiving the drive signal sent by the drive device. The motor is configured to output drive torque.

DETAILED DESCRIPTION

Figure 1:
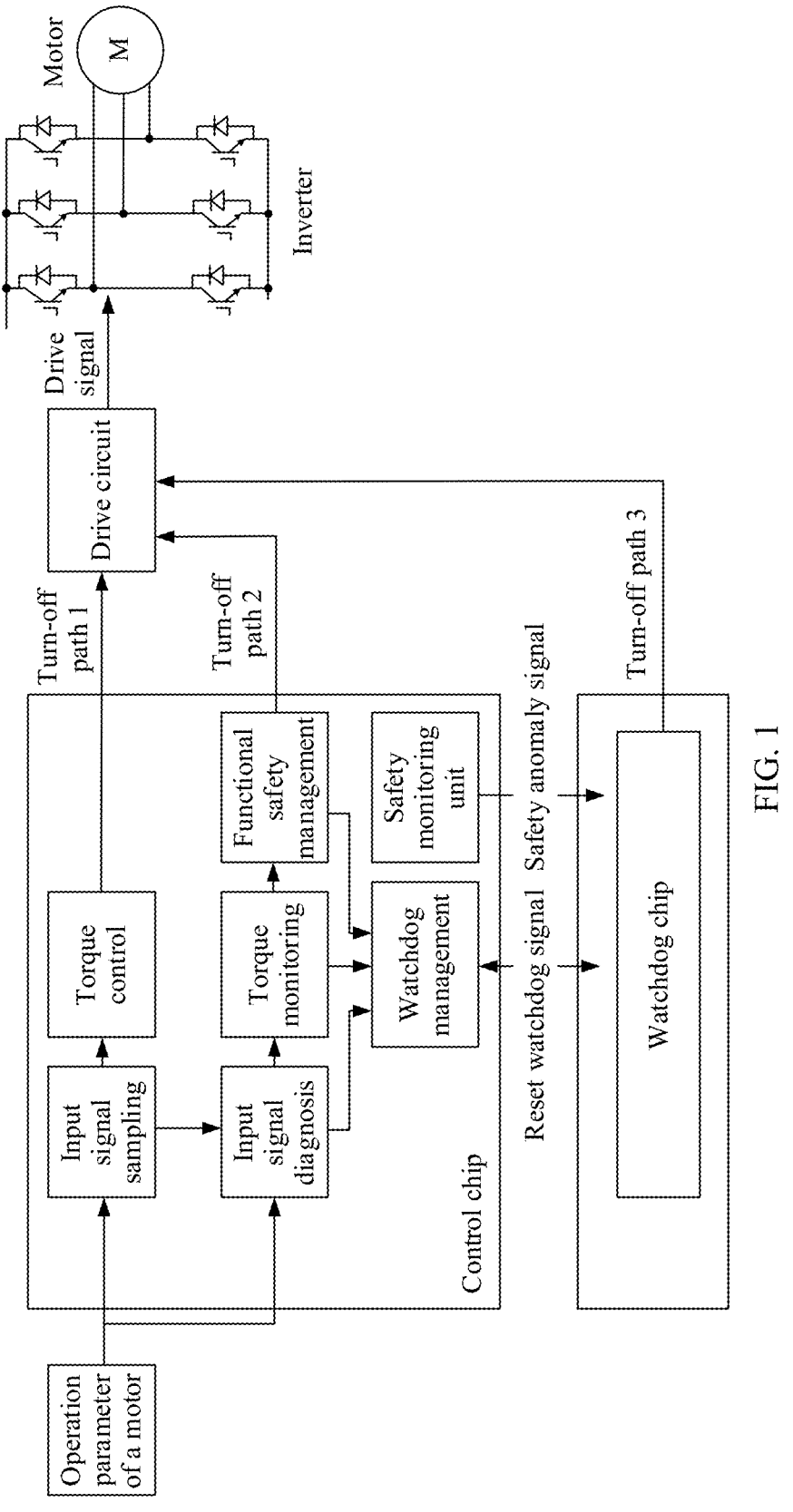
FIG. 1 is a schematic diagram 1 of a structure of a drive apparatus.

To make the objectives, technical solutions, and advantages clearer, the following further describes this disclosure in detail with reference to the accompanying drawings. A specific operation method in a method embodiment may also be applied to an apparatus embodiment or a system embodiment. "At least one" means one or more, and "a plurality of" means two or more. In view of this, "a plurality of" may also be understood as "at least two". The term "and/or" describes an association relationship for describing associated objects and represents that three relationships may exist. For example, A and/or B may represent the following three cases: Only A exists, both A and B exist, and only B exists. In addition, the character "/" generally indicates an "or" relationship between the associated objects. Terms such as "first" and "second" are merely used for distinguishing and description, but should not be understood as indicating or implying relative importance, or should not be understood as indicating or implying a sequence.

A "connection" may be understood as an electrical connection, and the connection between two electrical elements may be a direct or indirect connection between the two electrical elements. For example, a connection between A and B may indicate that A and B are directly connected to each other, or A and B are indirectly connected to each other by using one or more other electrical elements. For example, the connection between A and B may also indicate that A is directly connected to C, C is directly connected to B, and A and B are connected to each other through C.

A switch may be one or more of a plurality of types of switch transistors such as a relay, a metal-oxide-semiconductor field-effect transistor (MOSFET), a bipolar junction transistor (BJT), an insulated-gate bipolar transistor (IGBT), and a silicon carbide (SiC) transistor. These are not enumerated again. Switches may be packaged in a single-transistor packaging manner or a multi-transistor packaging manner. This is not limited in embodiments. Each switch may include a first electrode, a second electrode, and a control electrode, and the control electrode is configured to control on or off of the switch transistor. When a switch transistor is turned on, a current may be transmitted between a first electrode and a second electrode of the switch. When the switch is turned off, a current cannot be transmitted between the first electrode and the second electrode of the switch. An MOSFET is used as an example. A control electrode of the switch is a gate, a first electrode of the switch may be a source, and a second electrode of the switch may be a drain. Alternatively, the first electrode may be a drain, and the second electrode may be a source.

A drive apparatus may be used in a device that uses a motor to brake. The device includes but is not limited to an electric vehicle, an electric ship, an electric drone, an electric train, an electric lorry, an electric truck, a robot, an industrial device, smart logistics, a smart factory, and the like.

Figure 2:
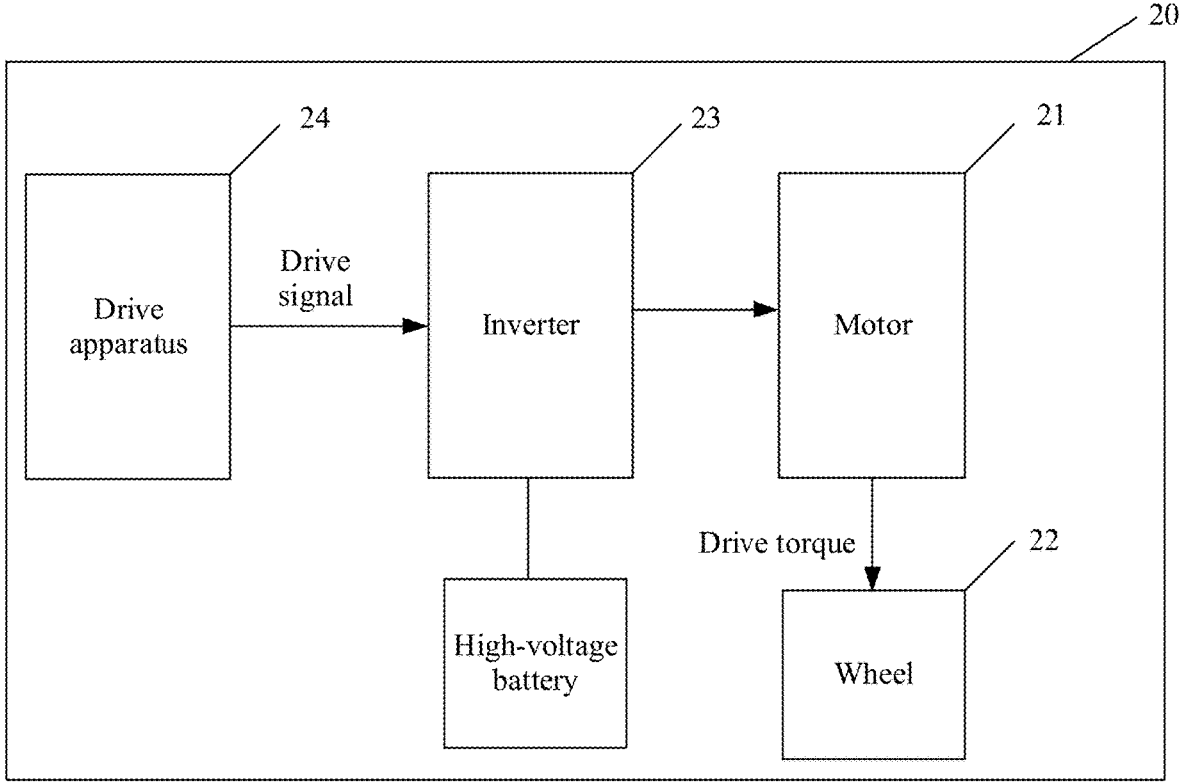
FIG. 2 is a schematic diagram of a structure of an electric vehicle.

In a specific scenario, the drive apparatus may be used in an electric vehicle. The vehicle is also referred to as a new energy vehicle, and is a vehicle driven by electric energy. As shown in FIG. 2, an electric vehicle 20 mainly includes a motor 21, a wheel 22, an inverter 23, and a drive apparatus 24.

When the electric vehicle travels, the motor 21 may obtain electric energy from the inverter 23, convert the obtained electric energy into mechanical energy, and output drive torque used to drive the wheel 22 to rotate. After receiving the drive torque, the wheel 22 rotates and drives the electric vehicle 20 to travel.

In actual use, the electric vehicle 20 further includes a high-voltage battery and a low-voltage battery, and the high-voltage battery 104 may be a large-capacity and high-power battery. The inverter 23 is connected to the high-voltage battery, and the inverter 23 may convert a direct current output by the high-voltage battery into an alternating current, and use the alternating current to supply power to the motor 21.

In actual use, the inverter 23 includes a plurality of switch components, the drive apparatus 24 may be connected to the plurality of switch components in the inverter 23, and the drive apparatus 24 may provide a corresponding drive signal for each switch in the inverter 23, to control the inverter 23 to convert a direct current into an alternating current. When the drive apparatus 24 stops outputting drive signals for switches in the inverter 23 or outputs drive signals for only some switches in the inverter 23, the motor cannot obtain a voltage required for the motor to operate normally, and correspondingly, the motor cannot output the drive torque used to drive the wheel 22 to rotate. Therefore, the drive apparatus 24 is one of important devices for controlling the drive torque output by the motor 21. Because safety of the torque output by the motor 21 is one of important functional safety objectives of the electric vehicle, as a requirement for functional safety of the electric vehicle is increasingly high, the drive apparatus 24 also needs to meet a specific safety level.

In actual use, the drive apparatus 24 may control to turn off the drive torque output by motor 21 when the electric vehicle travels normally, or may turn off the drive torque output by the motor 21 when the electric vehicle is faulty, to ensure travelling safety of the electric vehicle. In actual application, the drive apparatus mainly turns off the drive torque output by the motor through three turn-off paths. As shown in FIG. 1, the drive apparatus mainly includes a drive circuit, a control chip, and a watchdog chip. The drive circuit includes a plurality of drive chips, and each drive chip is connected to one switch component in the inverter in a one-to-one correspondence.

Currently, the drive apparatus with a high safety level mainly turns off the drive torque in the following three cases. (1) When the electric vehicle travels normally, a value of the drive torque is determined based on an operation parameter of the motor, and a drive signal of each switch is generated based on the value of the drive torque, to control a drive signal output by a drive chip, thereby controlling the drive torque output by the motor. In this case, each PWM signal and a component through which the two signals pass form a first turn-off path of the drive torque. (2) When the control chip detects that the drive torque calculated based on the operation parameter of the motor is abnormal or detects that a value of the operation parameter deviates from a parameter range obtained when the motor operates normally, a functional safety management unit in the control chip outputs a corresponding signal to the drive circuit, to control a drive signal output by a drive chip, thereby controlling the drive torque output by the motor. In this case, a signal output by the functional safety management unit and a component through which the signal passes form a second turn-off path of the drive torque. (3) The control chip periodically sends a watchdog signal to the watchdog chip, and the watchdog chip performs fault monitoring on the control chip by using the received watchdog signal. When detecting that the control chip is faulty, the watchdog chip outputs a corresponding signal to the drive circuit to control a drive signal output by a drive chip, thereby controlling the drive torque output by the motor. In this case, a signal output by the watchdog chip and a component through which the signal passes forms a third turn-off path of the drive torque.

In actual use, the first turn-off path may be implemented by using a pin that receives a PWM signal in the drive chip, both the second turn-off path and the third turn-off path are implemented by using other two pins in the drive chip, and the two pins are respectively connected to functional circuits arranged inside the drive chip. These functional circuits are available only to a drive chip with a specific safety level. If a vehicle regulation drive chip without a safety level is used, the drive chip does not have these functional circuits. Therefore, when a component of the drive apparatus is damaged or operates abnormally, the drive torque cannot be stopped through the second turn-off path and the third turn-off path. As a result, the electric vehicle may operate abnormally, or even the electric vehicle is out of control and personal injury is caused.

To resolve the foregoing problem, a signal output to a drive chip is changed, to reuse a turn-off path of drive torque, thereby meeting a safety requirement of an electric vehicle.

Figure 3:
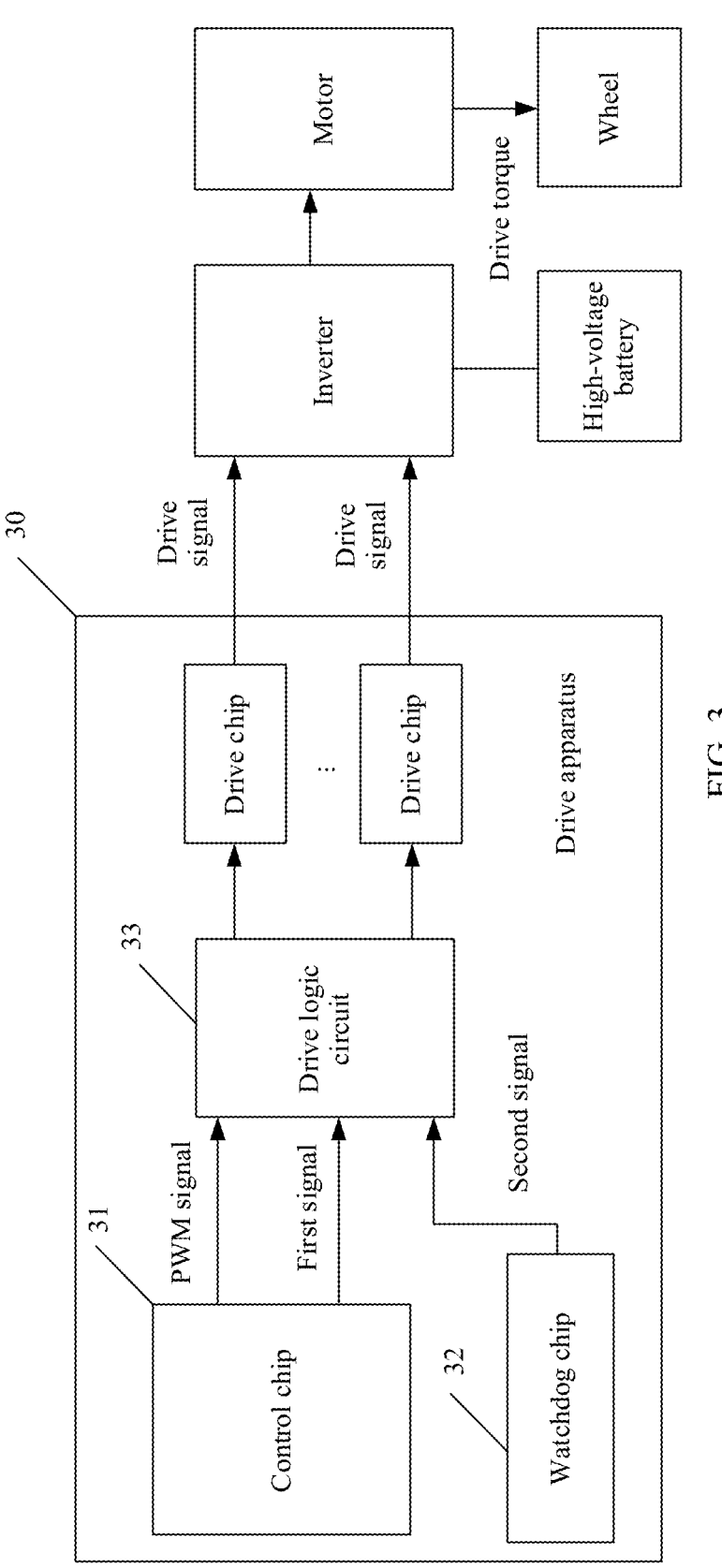
FIG. 3 is a schematic diagram 2 of a structure of a drive apparatus.

For example, FIG. 3 is a schematic diagram of a structure of a drive apparatus. As shown in FIG. 3, a drive apparatus 30 mainly includes a control chip 31, a watchdog chip 32, a drive logic circuit 33, and a plurality of drive chips 34. The plurality of drive chips 34 one-to-one correspond to a plurality of switches in an inverter.

Specifically, the control chip 31 is connected to the watchdog chip 32 and the drive logic circuit 33, and is configured to: receive an operation parameter of a motor, generate drive torque based on the operation parameter, determine a pulse width modulation PWM signal of each switch in the inverter based on the drive torque, output the PWM signal of each switch to the drive logic circuit 33, and when determining that the drive torque is abnormal or the operation parameter exceeds a specified range, send, to the drive logic circuit 33, a first signal representing that the drive torque is abnormal or the motor operates abnormally. The watchdog chip 32 is connected to the drive logic circuit 33, and is configured to: perform fault monitoring on the control chip 31, and when determining that the control chip is faulty, send, to the drive logic circuit 33, a second signal representing that the control chip is faulty. The drive logic circuit 33 is connected to the plurality of drive chips 34, and is configured to: generate a drive control signal and an enable signal of each switch based on the signals sent by the watchdog chip 32 and the control chip 33, and separately output the drive control signal and the enable signal of each switch to a drive chip 34 corresponding to the switch. Each drive chip 34 is provided with a first pin, a second pin, and a third pin. Both the first pin and the second pin are connected to the drive logic circuit 33. The third pin is configured to be connected to the switch corresponding to the drive chip 34. The drive chip 34 is configured to: receive the drive control signal of the corresponding switch through the first pin, receive the enable signal of the corresponding switch through the second pin, and adjust, based on the received drive control signal and the received enable signal, a drive signal output to the connected switch. The specified range may be a fluctuation range of the operation parameter of the motor when the electric vehicle travels normally.

Still refer to FIG. 3. The control chip 31 samples the operation parameter of the motor, determines, based on the operation parameter, the drive torque required by the electric vehicle, and determines a PWM signal of each switch in the inverter based on the drive torque. The PWM signal passes through the drive logic circuit 33, the first pin of the drive chip 34, and the second pin of the drive chip 34 to form a first turn-off path. When detecting that the operation parameter exceeds the specified range or generated drive torque is abnormal, the control chip 31 may generate the first signal representing that the drive torque is abnormal or the motor operates abnormally. The first signal passes through the drive logic circuit 33, the first pin of the drive chip 34, and the second pin of the drive chip 34 to form a second turn-off path. The watchdog chip 32 performs fault monitoring on the control chip 31, and generates the second signal representing that the control chip 31 is faulty when determining that the control chip 31 is faulty. The second signal passes through the drive logic circuit 33, the first pin of the drive chip 34, and the second pin of the drive chip 34 to form a third turn-off path.

As shown in FIG. 3, the drive logic circuit 33 receives signals on the three turn-off paths, and generates signals output to the first pin and the second pin of the drive chip 34, that is, drive torque is stopped on the three turn-off paths of the drive torque by using a same pin on the drive chip 34. When drive torque needs to be stopped on any turn-off path, the drive logic circuit adjusts the drive control signal and the enable signal that are respectively output to the first pin and the second pin of the drive chip 34, to control the drive chip and the inverter to turn off the drive torque output by the motor.

Figure 4:
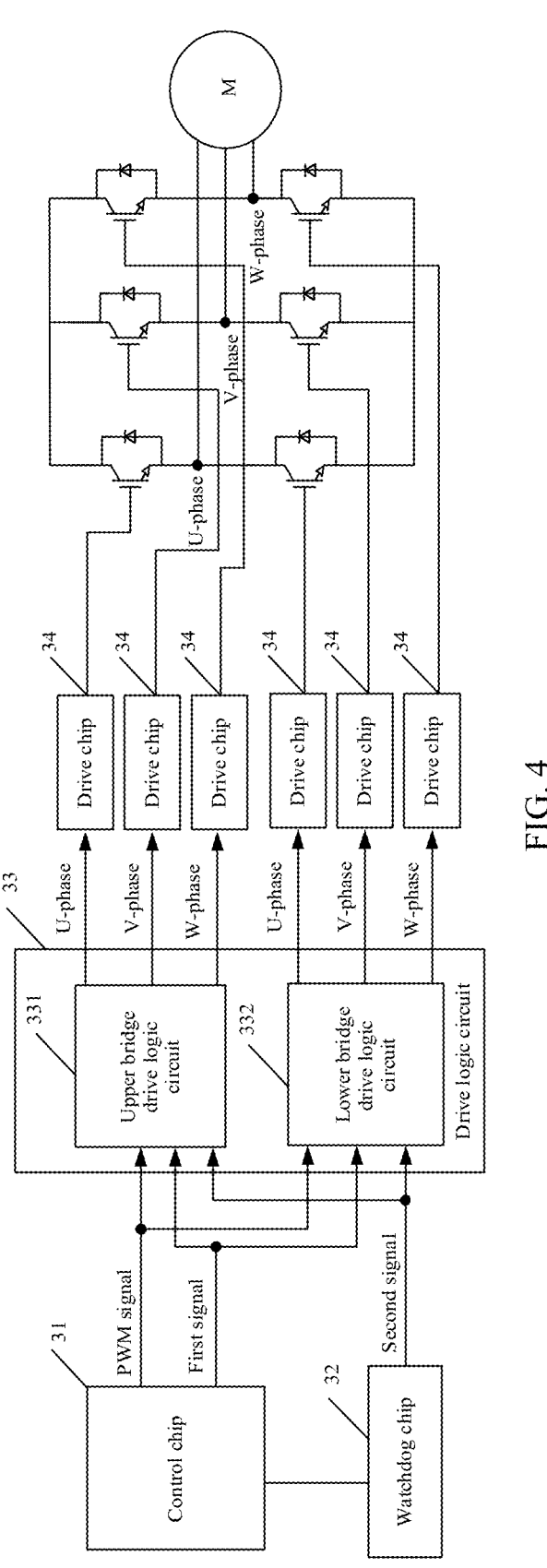
FIG. 4 is a schematic diagram 1 of a structure of a drive logic circuit.

For example, as shown in FIG. 4, a drive signal output by each drive chip 34 is separately transmitted to a corresponding switch in the inverter. Because drive logic of a switch in an upper bridge arm is different from drive logic of a switch in a lower bridge arm, and the drive torque output by the motor may be stopped by turning on only the switch in the upper bridge arm or only the switch in the lower bridge arm, the drive logic circuit 33 configured to control the drive chip 31 to output the drive signal may include two parts: an upper bridge drive logic circuit 331 and a lower bridge drive logic circuit 332.

In actual application, the electric vehicle further includes a high-voltage battery configured to be connected to the inverter, and the inverter may convert a direct current output by the high-voltage battery into an alternating current, and supply power to the motor in the electric vehicle. If the motor in the electric vehicle is a device that uses a single-phase alternating current to supply power, and the inverter in the electric vehicle is a single-phase inverter that outputs a single-phase alternating current, the single-phase inverter mainly includes two bridge arms used for inversion, each bridge arm may include two switches, a switch that is connected to a positive electrode of the high-voltage battery and that is in the two bridge arms forms an upper bridge arm switch, and a switch that is connected to a negative electrode of the high-voltage battery and that is in the two bridge arms forms a lower bridge arm switch. Similarly, if the motor in the electric vehicle is a device that uses a three-phase alternating current to supply power, and the inverter in the electric vehicle is a three-phase inverter that outputs a three-phase alternating current, the three-phase inverter mainly includes three bridge arms used for inversion, each bridge arm may include two switches, a switch that is connected to a positive electrode of the high-voltage battery and that is in the three bridge arms forms an upper bridge arm switch, and a switch that is connected to a negative electrode of the high-voltage battery and that is in the three bridge arms forms a lower bridge arm switch. When receiving a drive signal sent by a corresponding drive chip, each switch may perform inversion processing on a received direct current.

It should be understood that a structure of the inverter is not limited in this embodiment, and correspondingly, a quantity of drive chips 34 is not limited.

As shown in FIG. 4, the upper bridge drive logic circuit 331 is connected to a drive chip 34 corresponding to the upper bridge arm switch in the inverter, and is configured to: generate a drive control signal and an enable signal of each switch in the upper bridge arm in the inverter based on the signals sent by the watchdog chip 32 and the control chip 31, and output the drive control signal and the enable signal of each switch to the drive chip corresponding to the switch. The lower bridge drive logic circuit 332 is connected to a drive chip 34 corresponding to the lower bridge arm switch in the inverter, and is configured to: generate a drive control signal and an enable signal of each switch in the lower bridge arm in the inverter based on the signals sent by the watchdog chip 32 and the control chip 31, and output the drive control signal and the enable signal of each switch to the drive chip corresponding to the switch.

Still refer to FIG. 4. If the inverter in the electric vehicle is a three-phase inverter that outputs a three-phase alternating current, the three-phase alternating current may be formed by three single-phase alternating currents with a phase difference of 120°, and the three single-phase alternating currents may be a U-phase alternating current, a V-phase alternating current, and a W-phase alternating current respectively. Therefore, the three-phase inverter may include a U-phase bridge arm, a V-phase bridge arm, and a W-phase bridge arm. The U-phase bridge arm may be used to output the U-phase alternating current, the V-phase bridge arm may be used to output the V-phase alternating current, and the W-phase bridge arm may be used to output the W-phase alternating current. A switch that is connected to the positive electrode of the high-voltage battery and that is in the U-phase bridge arm, a switch that is connected to the positive electrode of the high-voltage battery and that is in the V-phase bridge arm, and a switch that is connected to the positive electrode of the high-voltage battery and that is in the W-phase bridge arm form the upper bridge arm switch. A switch that is connected to the negative electrode of the high-voltage battery and that is in the U-phase bridge arm, a switch that is connected to the negative electrode of the high-voltage battery and that is in the V-phase bridge arm, and a switch that is connected to the negative electrode of the high-voltage battery and that is in the W-phase bridge arm form the lower bridge arm switch.

Figure 5:
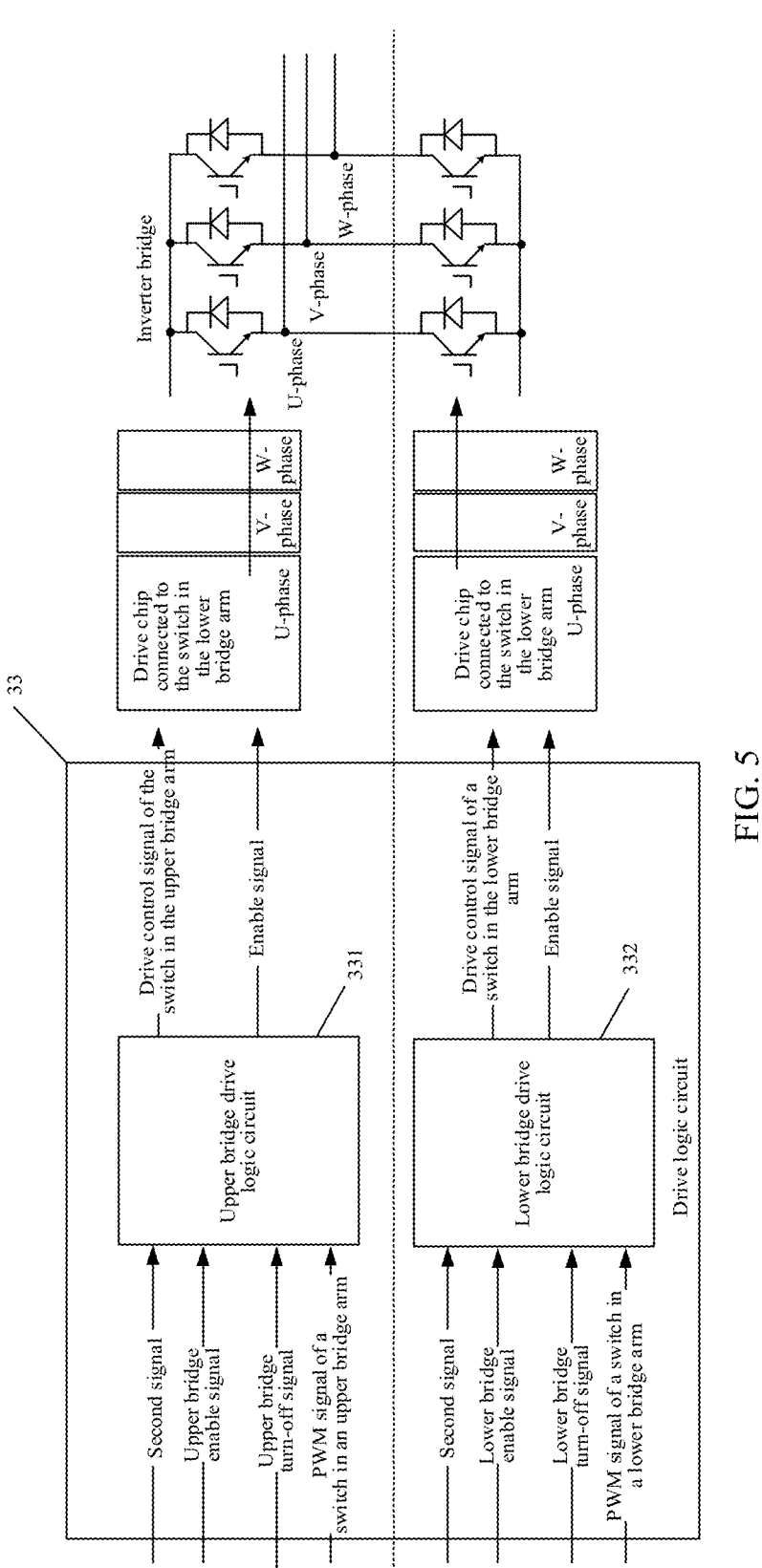
FIG. 5 is a schematic diagram 2 of a structure of a drive logic circuit.

In actual use, as shown in FIG. 5, the upper bridge drive logic circuit 331 is further configured to: generate an enable signal of each switch in the upper bridge arm in response to the received second signal and the received upper bridge enable signal, determine a drive control signal of each switch in the upper bridge arm based on the received upper bridge turn-off signal, the second signal, and a PWM signal of the switch in the upper bridge arm, and output the drive control signal of each switch to a drive chip corresponding to the switch. The lower bridge drive logic circuit 332 is further configured to: generate an enable signal of each switch in the lower bridge arm in response to the received second signal and the received lower bridge turn-off signal, determine a drive control signal of each switch in the lower bridge arm based on the received lower bridge turn-off signal, the second signal, and a PWM signal of the switch in the lower bridge arm, and output the drive control signal of each switch to a drive chip corresponding to the switch.

The following describes in detail circuit structures of the upper bridge drive logic circuit 331 and the lower bridge drive logic circuit 332 and generation processes of the drive control chip and the enable signal with reference to embodiments.

Figure 6:
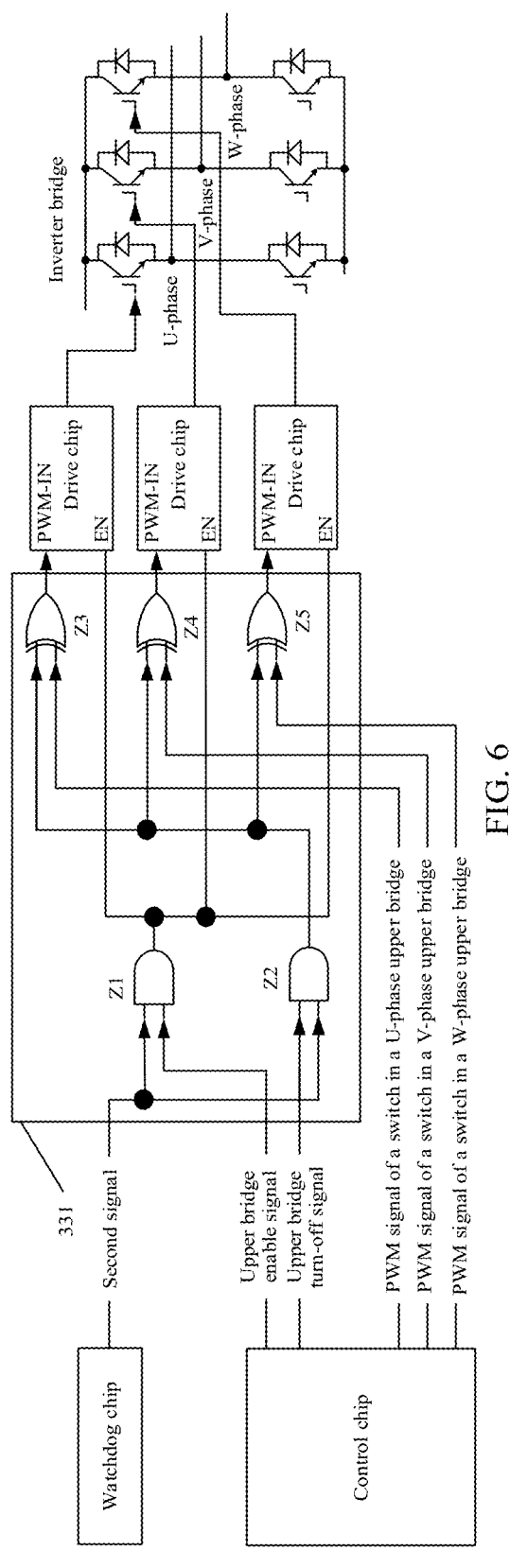
FIG. 6 is a schematic diagram of a structure of an upper bridge drive logic circuit.

The upper bridge drive logic circuit 331:

As shown in FIG. 6, the upper bridge drive logic circuit 331 includes a first AND gate circuit Z1, a second AND gate circuit Z2, a first OR gate circuit Z3, a second OR gate circuit Z4, and a third OR gate circuit Z5.

A first input end of the first AND gate circuit Z1 is connected to the control chip 31 and receives the upper bridge enable signal, a second input end of the first AND gate circuit Z1 is connected to the watchdog chip 32 and receives the second signal, and an output end of the first AND gate circuit Z1 is connected to a second pin of a drive chip connected to the upper bridge drive logic circuit 331. A first input end of the second AND gate circuit Z2 is connected to the control chip and receives the upper bridge turn-off signal, a second input end of the second AND gate circuit Z2 is connected to the watchdog chip 32 and receives the second signal, and an output end of the second AND gate circuit Z2 is separately connected to a first input end of the first OR gate circuit Z3, a first input end of the second OR gate circuit Z4, and a first input end of the third OR gate circuit Z4. A second input end of the first OR gate Z3 circuit is connected to the control chip 31 and receives a PWM signal of a switch that is connected to the positive electrode of the high-voltage battery and that is in the U-phase bridge arm, and an output end of the first OR gate circuit Z3 is connected to a first pin of a drive chip corresponding to the switch that is connected to the positive electrode of the high-voltage battery and that is in the U-phase bridge arm. A second input end of the second OR gate circuit Z4 is connected to the control chip 31 and receives a PWM signal of a switch that is connected to the positive electrode of the high-voltage battery and that is in the V-phase bridge arm, and an output end of the second OR gate circuit Z4 is connected to a first pin of a drive chip corresponding to the switch that is connected to the positive electrode of the high-voltage battery and that is in the V-phase bridge arm. A second input end of the third OR gate circuit Z5 is connected to the control chip 31 and receives a PWM signal of a switch that is connected to the positive electrode of the high-voltage battery and that is in the W-phase bridge arm, and an output end of the third OR gate circuit Z5 is connected to a first pin of a drive chip corresponding to the switch that is connected to the positive electrode of the high-voltage battery and that is in the W-phase bridge arm.

Still refer to FIG. 6. Z1 outputs enable signals of drive chips connected to three switches in the upper bridge arm, and outputs the enable signals to second pins of the drive chips. The second pins are briefly referred to as EN pins hereinafter. Z3 outputs a drive control signal of the drive chip corresponding to the switch that is connected to the positive electrode of the high-voltage battery and that is in the U-phase bridge arm, and outputs the drive control signal to a first pin of the drive chip. The first pin is briefly referred to as a PWM-IN pin hereinafter. Z4 outputs a drive control signal of the drive chip corresponding to the switch that is connected to the high-voltage battery and that is in the V-phase bridge arm, and outputs the drive control signal to a PWM-IN pin of the drive chip. Z5 outputs a drive control signal of the drive chip corresponding to the switch that is connected to the high-voltage battery and that is in the W-phase bridge arm, and outputs the drive control signal to a PWM-IN pin of the drive chip.

In actual application, a state of the enable signal may be determined based on correspondences that are between an input signal and the enable signal of the upper bridge drive logic circuit and that are shown in Table 1. 1 represents a low-level signal, 0 represents a high-level signal, and X is either 0 or 1. An example in which a low-level signal is a valid signal is used for description.

TABLE 1

| Correspondence between an input signal and an enable signal of an upper bridge drive logic circuit | | |
|---|---|---|
| Upper bridge enable signal | Second signal | Enable signal |
| 0 | 0 | 0 |
| X | 1 | 1 |
| 1 | 0 | 1 |
| X | 0 | X |

In actual application, a state of the drive control signal may be determined based on correspondences that are between an input signal and the drive control signal of the upper bridge drive logic circuit and that are shown in Table 2.

TABLE 2

| Correspondence between an input signal and a drive control signal of an upper bridge drive logic circuit | | | |
|---|---|---|---|
| Second signal | Upper bridge turn-off signal | PWM signal | Drive control signal |
| 0 | 0 | X | X |
| 0 | 1 | X | 1 |
| 1 | X | X | 0 |

With reference to the upper bridge drive logic circuit 331 shown in FIG. 6, Table 1, and Table 2, an implementation process of a turn-off path of the drive apparatus 30 is described below as an example.

First Turn-Off Path

The control chip 31 samples the operation parameter of the motor, calculates the drive torque required by the electric vehicle based on the sampled operation parameter, and calculates a PWM signal of each switch in the upper bridge arm based on the drive torque. Then, the control chip 31 outputs, to Z3, a PWM signal of a switch that is connected to the positive electrode of the high-voltage battery and that is in the U-phase bridge arm, outputs, to Z4, a PWM signal of a switch that is connected to the positive electrode of the high-voltage battery and that is in the V-phase bridge arm, and outputs, to Z5, a PWM signal of a switch that is connected to the positive electrode of the high-voltage battery and that is in the W-phase bridge arm. When the control chip 31 detects that both the drive torque and the operation parameter are normal, and the watchdog chip 32 detects that the control chip 31 is in a normal state, enable signals received by three drive chips are normal high-level signals, the first input end of Z3, the first input end of Z4, and the first input end of Z5 all receive high-level signals, PWM-IN pins of the three drive chips receive corresponding PWM signals, a state of a drive signal output by each drive chip is mainly controlled based on a level state of a received PWM signal, and when it is necessary to turn off or adjust the drive torque output by the motor, a PWM signal that meets a requirement may be output, to meet a power requirement of the electric vehicle.

Second Turn-Off Path

The control chip 31 samples the operation parameter of the motor, and determines that the motor operates abnormally when detecting that the operation parameter of the motor exceeds the specified range. When the motor operates abnormally or calculated drive torque is abnormal, the control chip 31 generates an upper bridge turn-off signal in a low-level state and an upper bridge enable signal in a low-level state. In this case, EN pins of three drive chips receive low-level signals, and drive signals output by the drive chips are stopped. In this case, the inverter cannot output a current and a voltage required for the motor to operate normally. Therefore, the drive torque output by the motor can be stopped, and it can be ensured that the electric vehicle is in a safe state.

Third Turn-Off Path

The watchdog chip 32 receives a reset watchdog signal sent by the control chip 31, and performs fault monitoring on the control chip 31 by using the reset watchdog signal. When determining that the control chip 31 is faulty, the watchdog chip 32 may send the second signal in a low-level state. In this case, EN pins of three drive chips receive low-level signals, and the watchdog chip 32 controls the drive chips to turn off the drive torque output by the motor, to ensure that the electric vehicle is in a safe state.

Figure 7:
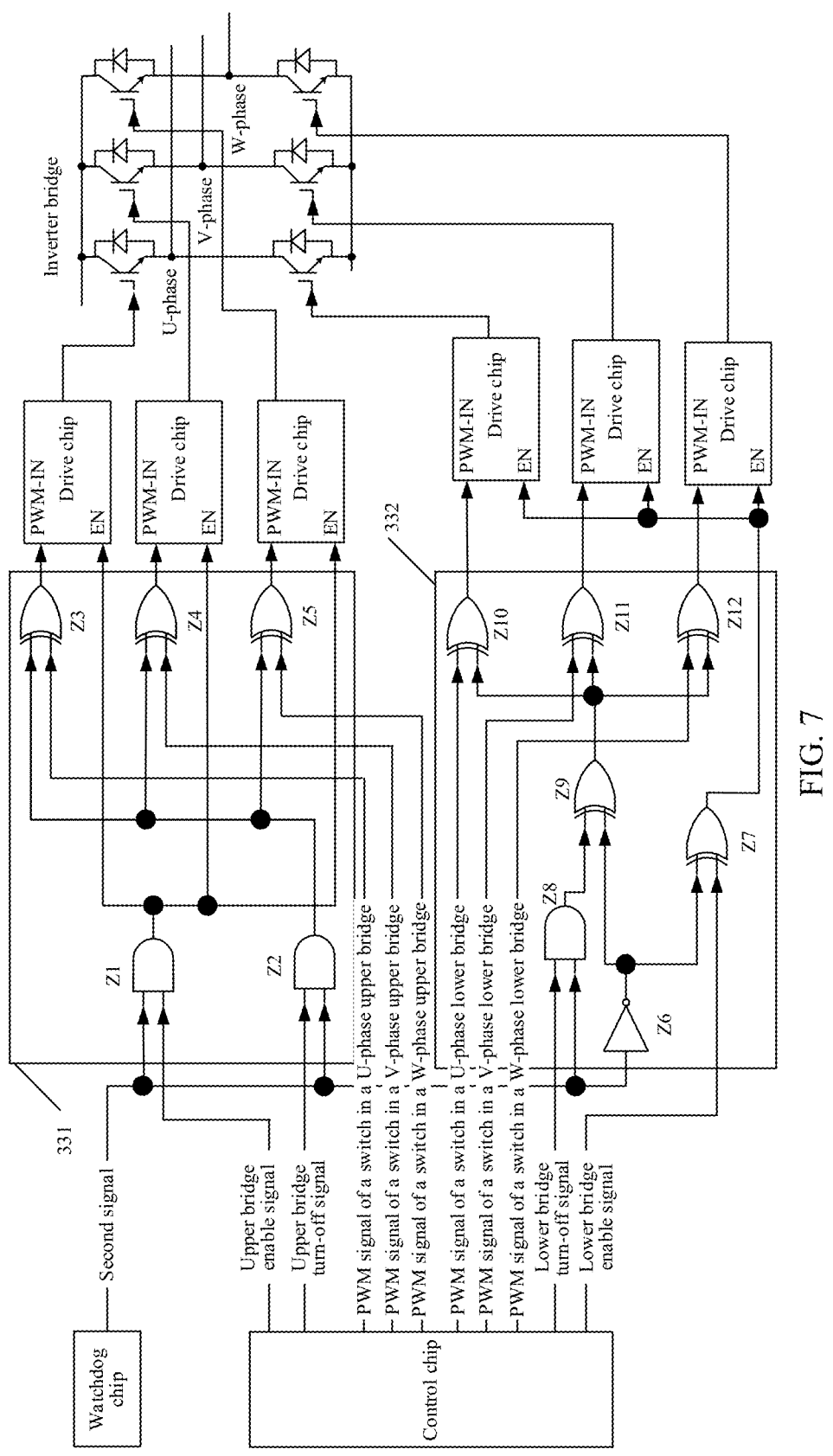
FIG. 7 is a schematic diagram of a structure of a lower bridge drive logic circuit.

The lower bridge drive logic circuit 332:

Refer to FIG. 7. The lower bridge drive logic circuit 332 includes a first phase inverter Z6, a third AND gate circuit Z7, a fourth OR gate circuit Z8, a fifth OR gate circuit Z9, a sixth OR gate circuit Z10, a seventh OR gate circuit Z11, and an eighth OR gate circuit Z12.

A first input end of the first phase inverter Z6 is connected to the watchdog chip 32 and receives the second signal, and an output end of the first phase inverter Z6 is connected to a first input end of the fourth OR gate circuit Z7. A second input end of the fourth OR gate circuit Z7 is connected to the control chip and receives the lower bridge enable signal, and an output end of the fourth OR gate circuit Z7 is connected to an EN pin of a drive chip connected to the lower bridge drive logic circuit 332. A first input end of the third AND gate circuit Z8 is connected to the control chip and receives the lower bridge turn-off signal, a second input end of the third AND gate circuit is connected to the watchdog chip 32 and receives the second signal, and an input end of the third AND gate circuit Z8 is connected to a first input end of the fifth OR gate circuit Z9. A second input end of the fifth OR gate circuit Z9 is connected to the output end of the first phase inverter Z6, and an input end of the fifth OR gate circuit Z9 is separately connected to a first input end of the sixth OR gate circuit Z10, a first input end of the seventh OR gate circuit Z11, and a first input end of the eighth OR gate circuit Z12. A second input end of the sixth OR gate circuit Z10 is connected to the control chip 31 and receives a PWM signal of a switch that is connected to the negative electrode of the high-voltage battery and that is in the U-phase bridge arm, and an output end of the sixth OR gate circuit Z10 is connected to a PWM-IN pin of a drive chip corresponding to the switch that is connected to the negative electrode of the high-voltage battery and that is in the U-phase bridge arm. A second input end of the seventh OR gate circuit Z11 is connected to the control chip 31 and receives a PWM signal of a switch that is connected to the negative electrode of the high-voltage battery and that is in the V-phase bridge arm, and an output end of the seventh OR gate circuit Z10 is connected to a PWM-IN pin of a drive chip corresponding to the switch that is connected to the negative electrode of the high-voltage battery and that is in the V-phase bridge arm. A second input end of the eighth OR gate circuit Z12 is connected to the control chip 31 and receives a PWM signal of a switch that is connected to the negative electrode of the high-voltage battery and that is in the W-phase bridge arm, and an output end of the eighth OR gate circuit Z12 is connected to a PWM-IN pin of a drive chip corresponding to the switch that is connected to the negative electrode of the high-voltage battery and that is in the W-phase bridge arm.

As shown in FIG. 7, Z7 outputs enable signals of drive chips connected to three switches in the lower bridge arm, and outputs the enable signals to EN pins of the drive chips, and Z10 outputs a drive control signal of the drive chip corresponding to the switch that is connected to the negative electrode of the high-voltage battery and that is in the U-phase bridge arm, and outputs the drive control signal to a PWM-IN pin of the drive chip. Z11 outputs a drive control signal of the drive chip corresponding to the switch that is connected to the negative electrode of the high-voltage battery and that is in the V-phase bridge arm, and outputs the drive control signal to a PWM-IN pin of the drive chip. Z12 outputs a drive control signal of the drive chip corresponding to the switch that is connected to the negative electrode of the high-voltage battery and that is in the W-phase bridge arm, and outputs the drive control signal to a PWM-IN pin of the drive chip.

In actual application, a state of the enable signal may be determined based on correspondences that are between an input signal and the enable signal of the lower bridge drive logic circuit that are shown in Table 3.

TABLE 3

Correspondence between an input signal and an
enable signal of a lower bridge logic circuit

| Lower bridge enable signal | Second signal | Enable signal |
|---|---|---|
| 0 | 0 | 0 |
| X | 1 | 1 |
| X | 0 | 0 |
| 1 | 0 | 1 |

In actual application, a state of the drive control signal may be determined based on correspondences that are between an input signal and the drive control signal of the lower bridge drive logic circuit and that are shown in Table 4.

TABLE 4

Correspondence between an input signal and a drive control
signal of a lower bridge drive logic circuit

| Second signal | Lower bridge turn-off signal | PWM signal | Drive control signal |
|---|---|---|---|
| 0 | 0 | 0 | X |
| 0 | 1 | X | 1 |
| 1 | X | X | 1 |

With reference to the lower bridge drive logic circuit 332 shown in FIG. 7, Table 3 and Table 4, an implementation process of a turn-off path of the drive apparatus 30 is described below as an example.

First Turn-Off Path

The control chip 31 samples the operation parameter of the motor, calculates the drive torque required by the electric vehicle based on the sampled operation parameter, and calculates a PWM signal of each switch in the lower bridge arm based on the drive torque. Then, the control chip 31 outputs, to Z10, a PWM signal of a switch that is connected to the negative electrode of the high-voltage battery and that is in the U-phase bridge arm, outputs, to Z11, a PWM signal of a switch that is connected to the negative electrode of the high-voltage battery and that is in the V-phase bridge arm, and outputs, to Z12, a PWM signal of a switch that is connected to the negative electrode of the high-voltage battery and that is in the W-phase bridge arm. When the control chip 31 detects that both the drive torque and the operation parameter are normal, and the watchdog chip 32 detects that the control chip 31 is in a normal state, enable signals received by three drive chips are all high-level signals that operate normally, the first input end of Z10, the first input end of Z11, and the first input end of Z12 all receive high-level signals, PWM-IN pins of the three drive chips receive corresponding PWM signals, a state of a drive signal output by each drive chip is mainly controlled based on a level state of a received PWM signal, and when it is necessary to turn off or adjust the drive torque output by the motor, a PWM signal that meets a requirement may be output, to meet a power requirement of the electric vehicle.

Second Turn-Off Path

The control chip 31 samples the operation parameter of the motor, and determines that the motor operates abnormally when detecting that the operation parameter of the motor exceeds the specified range. When the motor operates abnormally or calculated drive torque is abnormal, the control chip 31 generates a lower bridge turn-off signal in a low-level state and a lower bridge enable signal in a low-level state. In this case, EN pins of three drive chips receive low-level signals, and drive signals output by the drive chips are stopped. In this case, the inverter cannot output a current and a voltage required for the motor to operate normally. Therefore, the drive torque output by the motor can be stopped, and it can be ensured that the electric vehicle is in a safe state.

Third Turn-Off Path

The watchdog chip 32 receives a reset watchdog signal sent by the control chip 31, and performs fault monitoring on the control chip 31 by using the reset watchdog signal. When determining that the control chip 31 is faulty, the watchdog chip 32 may send the second signal in a low-level state. In this case, EN pins of three drive chips receive low-level signals, and drive signals output by the drive chips are stopped. In this case, the inverter cannot output a current and a voltage required for the motor to operate normally. Therefore, the drive torque output by the motor can be stopped, and it can be ensured that the electric vehicle is in a safe state.

In actual use, both the control chip and the watchdog chip may use an existing chip with a high safety level, and are configured to generate signals on the three turn-off paths. This is not specifically limited.

As shown in FIG. 6 and FIG. 7, the drive apparatus 30 is used to provide a drive signal for the inverter. When a fault occurs or no fault occurs, a signal of a corresponding level state may be output on the three turn-off paths. After receiving the signal, the drive logic circuit generates a drive control signal and an enable signal that are required for controlling the drive chip to turn off the drive torque, to achieve a purpose of the three turn-off paths, that is, turn off the drive torque. In the foregoing structure, the three turn-off paths of the drive torque may be implemented by using an enable pin and a pin used for receiving a drive PWM signal in an existing vehicle regulation drive chip without a safety level, to meet a requirement of the electric vehicle for a safety level.

It should be understood that the foregoing is only an effective manner to turn off drive torque of a low-level signal. In other implementations, the upper bridge drive logic circuit and the lower bridge drive logic circuit may use a high-level effective logic gate circuit to turn off the drive torque output by the motor.

It should be noted that the description of the drive logic circuit is merely an example. In actual use, the drive logic circuit may stop providing drive signals for all switches in the inverter, or provide drive signals for some switches, for example, may provide drive signals for only switches in the lower bridge arm. In this case, the inverter cannot output a three-phase alternating current required for the motor to operate normally, and the drive torque output by the motor is stopped. Therefore, according to a manner of turning off the drive torque, the drive logic circuit may alternatively use another logic gate circuit.

In actual use, when the inverter outputs a three-phase alternating current, because the three-phase alternating current is formed by three single-phase alternating currents with a phase difference of 120°, a fixed delay exists between drive signals that are sent by drive chips and that are used to control the inverter to output the three-phase alternating current. To implement precise control on each component in the inverter, the upper bridge drive logic circuit 331 may include a plurality of first logic circuits, and the lower bridge drive logic circuit 332 includes a plurality of second logic circuits.

Each of the first logic circuits one-to-one corresponds to each switch in the upper bridge arm. For example, the upper bridge drive circuit includes three first logic circuits, a 1st first logic circuit corresponds to a switch that is connected to the positive electrode of the high-voltage battery and that is in the U-phase bridge arm, a 2nd first logic circuit corresponds to a switch that is connected to the positive electrode of the high-voltage battery and that is in the V-phase bridge arm, and a 3rd first logic circuit corresponds to a switch that is connected to the positive electrode of the high-voltage battery and that is in the W-phase bridge arm. Similarly, each of the second logic circuits one-to-one corresponds to each switch in the lower bridge arm. For example, the lower bridge drive circuit includes three second logic circuits, a 1st second logic circuit corresponds to a switch that is connected to the negative electrode of the high-voltage battery and that is in the U-phase bridge arm, a 2nd second logic circuit corresponds to a switch that is connected to the negative electrode of the high-voltage battery and that is in the V-phase bridge arm, and a 3rd second logic circuit corresponds to a switch that is connected to the negative electrode of the high-voltage battery and that is in the W-phase bridge arm.

Specifically, the first logic circuit is connected to the watchdog chip 32 and the control chip 31, and the first logic circuit is configured to: be connected to a drive chip to which a corresponding switch is connected, generate, based on the signals sent by the watchdog chip 32 and the control chip 31, a drive control signal and an enable signal of the corresponding switch, and output the drive control signal and the enabled signal to the connected drive chip. The second logic circuit is connected to the watchdog chip 32 and the control chip 31, and the second logic circuit is configured to: be connected to a drive chip to which a corresponding switch is connected, generate, based on the signals sent by the watchdog chip 32 and the control chip 31, a drive control chip and an enable signal of the corresponding switch, and output the drive control signal and the enable signal to the connected drive chip.

Figure 8:
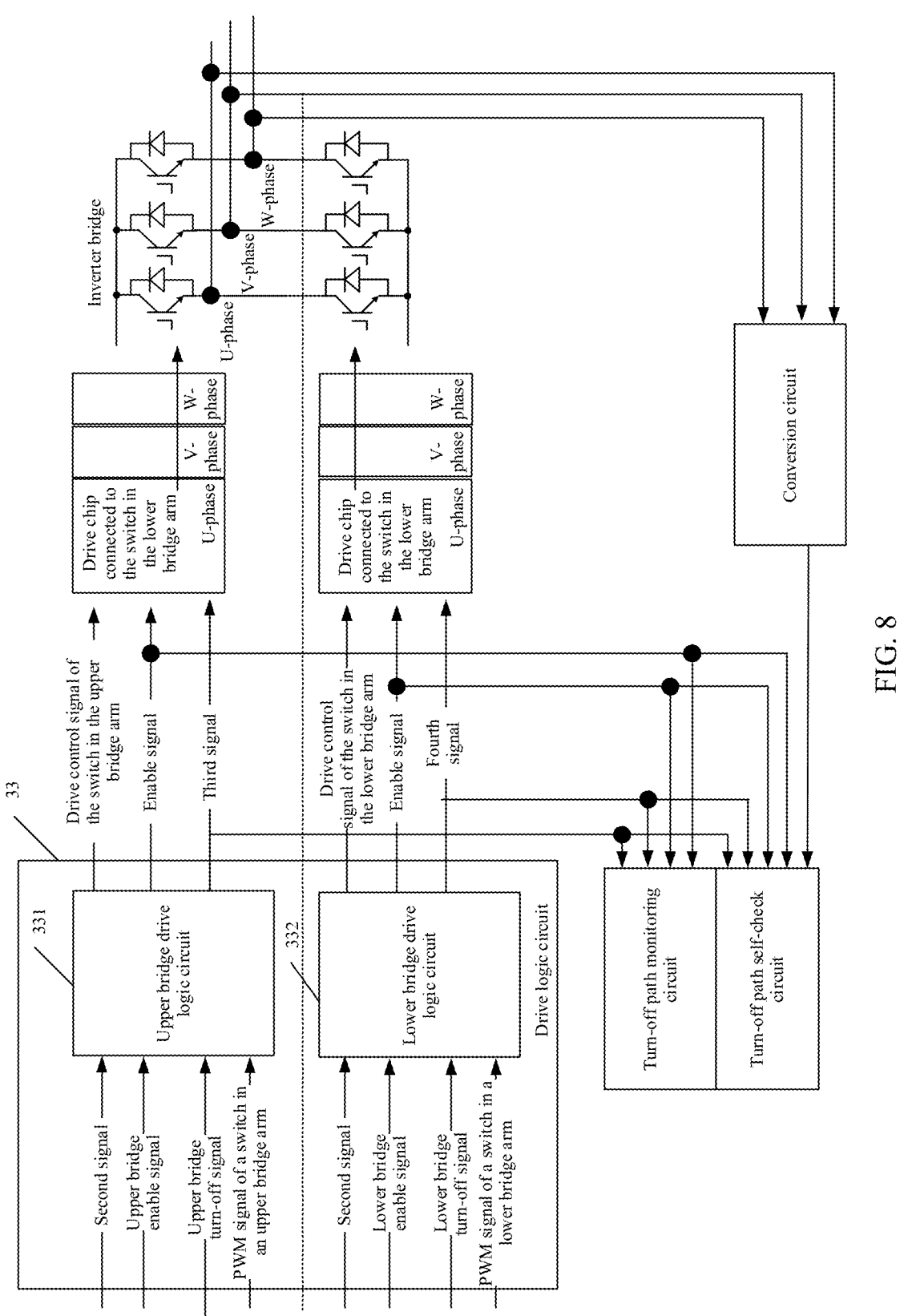
FIG. 8 is a schematic diagram 3 of a structure of a drive apparatus.

In actual use, signals on the three turn-off paths formed by the control chip 31 and the watchdog chip 32 pass the drive logic circuit, to form a corresponding drive control signal and an enable signal, and the drive control signal and the enable signal are sent to the drive chip, to turn off the drive torque. A vehicle regulation drive chip without a safety level is used. To ensure a safety level of an electric vehicle, as shown in FIG. 8, the drive apparatus 30 may further include a turn-off path self-check circuit and a turn-off path monitoring circuit that are used to detect whether the three turn-off paths are effectively turned off.

In actual use, the upper bridge drive logic circuit may further output a third signal representing a drive state of a switch in the upper bridge arm, and the lower bridge drive logic circuit may further output a fourth signal representing a drive state of a switch in the lower bridge arm.

In actual use, a state of the third signal may be determined based on correspondences that are between an input signal and the third signal of the upper bridge drive logic circuit 331 and that are shown in Table 5.

TABLE 5

| Correspondence between an input signal and a third signal of a upper bridge drive logic circuit | | | |
| --- | --- | --- | --- |
| Second signal | Upper bridge turn-off signal | PWM signal | Third signal |
| 0 | 0 | X | 0 |

TABLE 5-continued

| Correspondence between an input signal and a third signal of a upper bridge drive logic circuit | | | |
| --- | --- | --- | --- |
| Second signal | Upper bridge turn-off signal | PWM signal | Third signal |
| 0 | 1 | X | 1 |
| 1 | X | X | 0 |

In actual use, a state of the fourth signal may be determined based on correspondences that are between an input signal and the fourth signal of the lower bridge drive logic circuit 332 and that are shown in Table 6.

TABLE 6

| Correspondence between an input signal and a fourth signal of a lower bridge drive logic circuit | | | |
| --- | --- | --- | --- |
| Second signal | Lower bridge turn-off signal | PWM signal | Fourth signal |
| 0 | 0 | X | 0 |
| 0 | 1 | X | 1 |
| 1 | X | X | 1 |

It should be noted that the third signal and the fourth signal may be output by using a related logic gate circuit. A structure of the logic gate circuit is not limited.

As shown in FIG. 8, the turn-off path self-check circuit is connected to the drive logic circuit, and the turn-off path self-check circuit is configured to: when the drive apparatus is started, receive the enable signal, the third signal, and the fourth signal that are output by the drive logic circuit, and when a state of a received signal is abnormal, notify the drive logic circuit and the drive chip to turn off the drive torque output by the motor. The turn-off path monitoring circuit is connected to the drive logic circuit, and the turn-off path monitoring circuit is configured to: receive the enable signal, the third signal, and the fourth signal, and when a state of a received signal is abnormal, notify the drive logic circuit and the drive chip to turn off the drive torque output by the motor.

It should be understood that, when the drive apparatus is powered on and started, the drive apparatus performs self-check on the three turn-off paths, and the turn-off path self-check circuit may detect level states of a plurality of signals received in a power-on self-check process of the drive apparatus, and determine whether each turn-off path is reliably turned off. The turn-off path monitoring circuit may detect level states of a plurality of signals output by the drive logic circuit in an operation process of the drive apparatus, and determine whether each turn-off path is reliably turned off.

Specifically, when the drive apparatus is powered on and started, the watchdog chip 32 and the control chip 31 are controlled to sequentially output signals required for turning off the drive torque of the three turn-off paths, and the turn-off path self-check circuit sequentially detects level states of a plurality of signals output by the drive logic circuit 33, determines whether the three turn-off paths can be effectively turned off based on the states of the plurality of signals, and when determining that a level state of a received signal is abnormal and one or more of the three turn-off paths cannot be effectively turned off, notify the drive logic circuit and the drive chip to turn off the drive torque output by the motor.

Specifically, during an operation process of the drive apparatus 30, the turn-off path monitoring circuit monitors the level states of the plurality of signals output by the drive logic circuit 33, and determines whether a level state of a signal that is currently output meets a requirement of turning off the drive torque. In addition, when determining that the level state of the received signal is abnormal, and the drive torque of the turn-off path cannot be stopped, the turn-off path monitoring circuit may notify the drive logic circuit and the drive chip to turn off the drive torque output by the motor.

In a possible implementation, the drive apparatus further includes a conversion circuit. The conversion circuit is connected to the turn-off path self-check circuit, and the conversion circuit is configured to: be connected to an output end of the inverter, convert, into a digital signal, an electrical parameter that is in an analog signal form and that is output by the output end of the inverter, and output an electrical parameter of the digital signal to the turn-off path self-check circuit. The turn-off path self-check circuit is further configured to: when the drive apparatus is started, determine, based on a preset duty cycle of a drive signal output by the drive apparatus, a specified range of the electrical parameter output by the inverter, and when the electrical parameter of the received digital signal exceeds the specified range, notify the drive logic circuit and the drive chip to turn off the drive torque output by the motor.

In an example, the conversion circuit is an isolated digital-to-analog converter.

In another example, if the conversion circuit is a non-isolated digital-to-analog converter, the drive apparatus further includes an isolator, the isolator is configured to implement isolation between the inverter and the drive apparatus, and the analog-to-digital converter is configured to convert, into an analog signal, an electrical parameter that is in a digital signal form and that is output by the inverter.

Based on a same inventive idea, an electric vehicle includes a wheel, an inverter, a motor, and the drive apparatus 30 provided in embodiments.

The drive apparatus 30 is connected to the inverter, and is configured to provide drive signals for a plurality of switches in the inverter.

The electric vehicle further includes a high-voltage battery. The inverter is connected to the high-voltage battery and the motor, and when receiving a drive signal sent by the drive apparatus, converts a direct current output by the high-voltage battery into an alternating current, and supplies power to the motor.

The motor is connected to the wheel, and the motor is configured to output drive torque to the wheel, to drive the wheel to drive the electric vehicle to travel.

It is clear that a person skilled in the art can make various modifications and variations to this disclosure without departing from the protection scope of this disclosure. This disclosure is intended to cover these modifications and variations provided that they fall within the scope of protection defined by the following claims and their equivalent technologies.

The invention claimed is:
1. A drive apparatus comprising:
a control chip configured to:
receive an operation parameter of a motor of an electric vehicle;
generate a drive torque based on the operation parameter;

generate pulse-width modulation (PWM) signals of switches in an inverter of the electric vehicle based on the drive torque;
output the PWM signals; and
send, when the drive torque is abnormal or the operation parameter exceeds a first specified range, a first signal representing that the drive torque is abnormal or the motor operates abnormally;
a watchdog chip connected to the control chip and configured to:
perform fault monitoring on the control chip; and
send, when the control chip is faulty, a second signal representing that the control chip is faulty;
a drive logic circuit connected to the control chip and the watchdog chip and configured to:
receive the PWM signals and the first signal from the control chip;
receive the second signal from the watchdog chip;
generate drive control signals and enable signals of the switches based on the PWM signals, the first signal, and the second signal; and
output the drive control signals and the enable signals; and
drive chips connected to the drive logic circuit and comprising first pins connected to the drive logic circuit, second pins connected to the drive logic circuit, and third pins configured to connect to the switches, wherein the drive chips are configured to:
receive the drive control signals through the first pins;
receive the enable signals through the second pins; and
adjust, based on the drive control signals and the enable signals, drive signal outputs to the switches.
2. The drive apparatus of claim 1, wherein the first signal comprises an upper bridge turn-off signal, an upper bridge turn-off enable signal, a lower bridge turn-off signal, or a lower bridge turn-off enable signal.
3. The drive apparatus of claim 2, wherein the drive logic circuit comprises:
an upper bridge drive logic circuit connected to at least one first drive chip of the drive chips, wherein the at least one first drive chip corresponds to at least one first switch of the switches in an upper bridge arm in the inverter, wherein the upper bridge drive logic circuit is configured to:
generate at least one first drive control signal of the drive control signals and at least one first enable signal of the enable signals based on the PWM signals, the first signal, and the second signal; and
output the at least one first drive control signal and the at least one first enable signal to the at least one first drive chip; and
a lower bridge drive logic circuit connected to at least one second drive chip of the drive chips, wherein the at least one second drive chip corresponds to at least one second switch of the switches in a lower bridge arm of the inverter, and wherein the lower bridge drive logic circuit is configured to:
generate at least one second drive control signal of the drive control signals and at least one second enable signal of the enable signals based on PWM signals, the first signal, and the second signal; and
output the at least one second drive control signal and the at least one second enable signal to the at least one second drive chip.
4. The drive apparatus of claim 3, wherein the upper bridge drive logic circuit is further configured to:

further generate the at least one first enable signal in response to the second signal or an upper bridge enable signal; and further generate the at least one first drive control signal based on the second signal, the upper bridge turn-off signal, and at least one PWM signal of the PWM signals and corresponding to the at least one first switch.

5. The drive apparatus of claim 3, wherein the lower bridge drive logic circuit is further configured to:

further generate the at least one second enable signal in response to the second signal or the lower bridge turn-off signal; and further generate the at least one second drive control signal based on the second signal, the lower bridge turn-off signal, and at least one PWM signal of the PWM signals and corresponding to the at least one second switch.

6. The drive apparatus of claim 3, wherein the upper bridge drive logic circuit comprises at least one first logic circuit respectively corresponding to the at least one first switch, and wherein the lower bridge drive logic circuit comprises at least one second logic circuit respectively corresponding to the at least one second switch.

7. The drive apparatus of claim 3, wherein the upper bridge drive logic circuit comprises:

a first AND gate circuit comprising:
    a first input end connected to the control chip;
    a second input end connected to the watchdog chip; and
    a first output end connected to the at least one first drive chip;

a second AND gate circuit comprising:
    a third input end connected to the control chip;
    a fourth input end connected to the watchdog chip; and
    a second output end;

a first OR gate circuit comprising:
    a fifth input end connected to the second output end;
    a sixth input end connected to the control chip; and
    a third output end connected to the at least one first drive chip;

a second OR gate circuit comprising:
    a seventh input end connected to the second output end;
    an eighth input end connected to the control chip; and
    a fourth output end connected to the at least one first drive chip; and a third OR gate circuit comprising:
    a ninth input end connected to the second output end;
    a tenth input end connected to the control chip; and
    a fifth output end connected to the at least one first drive chip.

8. The drive apparatus of claim 3, wherein the lower bridge drive logic circuit comprises:

a phase inverter comprising:
    a first input end connected to the watchdog chip; and
    a first output end;

an AND gate circuit comprising:
    a second input end connected to the control chip;
    a third input end connected to the watchdog chip; and
    a second output end;

a first OR gate circuit comprising:
    a fourth input end connected to the first output end;
    a fifth input end connected to the control chip; and
    a third output end connected to the at least one second drive chip;

a second OR gate circuit comprising:
    a sixth input end connected to the second output end;

a seventh input end connected to the first output end; and
    a fourth output end;

a third OR gate circuit comprising:
    an eighth input end coupled to the fourth output end;
    a ninth input end connected to the control chip; and
    a fifth output end connected to the at least one second drive chip;

a fourth OR gate circuit comprising:
    a tenth input end coupled to the fourth output end;
    an eleventh input end connected to the control chip; and
    a sixth output end connected to the at least one second drive chip;

a fifth OR gate circuit comprising:
    a twelfth input end coupled to the fourth output end;
    a thirteenth input end connected to the control chip; and
    a seventh output end connected to the at least one second drive chip.

9. The drive apparatus of claim 8, wherein the upper bridge drive logic circuit is further configured to output a third signal representing a first drive state of the at least one first switch, and wherein the lower bridge drive logic circuit is further configured to output a fourth signal representing a second drive state of the at least one second switch.

10. The drive apparatus of claim 9, further comprising:

a turn-off path self-check circuit configured to:
    receive the enable signals, the third signal, and the fourth signal when the drive apparatus starts; and
    notify the drive logic circuit and the drive chip to turn off the drive torque when the enable signals, the third signal, or the fourth signal is abnormal; and a turn-off path monitoring circuit configured to:
    receive the enable signals, the third signal, and the fourth signal; and
    notify the drive logic circuit and the drive chip to turn off the drive torque when the enable signals, the third signal, or the fourth signal is abnormal.

11. The drive apparatus of claim 10, further comprising a conversion circuit configured to:

connect to an inverter output end of the inverter;

receive an analog electrical parameter from the inverter output end;

convert the analog electrical parameter into a digital electrical parameter; and output the digital electrical parameter to the turn-off path self-check circuit, and wherein the turn-off path self-check circuit is further configured to:
    determine, when the drive apparatus is started and based on a preset duty cycle of a drive signal of the drive apparatus, a second specified range of the digital electrical parameter; and
    notify, when the digital electrical parameter exceeds the second specified range, the drive logic circuit and the drive chip to turn off the drive torque.

12. The drive apparatus of claim 11, further comprising an isolator configured to connect between the inverter output end and the conversion circuit.

13. An electric vehicle comprising:

a motor configured to output a drive torque;

an inverter connected to the motor, comprising switches, and configured to supply power to the motor in response to a drive signal; and a drive apparatus connected to the inverter, configured to provide the drive signal to the inverter, and comprising:
    a control chip configured to:
        receive an operation parameter of the motor;

generate the drive torque based on the operation parameter;

generate pulse-width modulation (PWM) signals of the switches based on the drive torque;

output the PWM signals; and send, when the drive torque is abnormal or the operation parameter exceeds a first specified range, a first signal representing that the drive torque is abnormal or the motor operates abnormally;

a watchdog chip connected to the control chip and configured to:

perform fault monitoring on the control chip; and send, when the control chip is faulty, a second signal representing that the control chip is faulty;

a drive logic circuit connected to the control chip and the watchdog chip and configured to:

receive the PWM signals and the first signal from the control chip;

receive the second signal from the watchdog chip;

generate drive control signals and enable signals of the switches based on the PWM signals, the first signal, and the second signal; and output the drive control signals and the enable signals; and drive chips connected to the drive logic circuit and comprising first pins connected to the drive logic circuit, second pins connected to the drive logic circuit, and third pins configured to connect to the switches, wherein the drive chips are configured to:

receive the drive control signals through the first pins;

receive the enable signals through the second pins; and adjust, based on the drive control signals and the enable signals, drive signal outputs to the switches.

14. The electric vehicle of claim 13, wherein the first signal comprises an upper bridge turn-off signal, an upper bridge turn-off enable signal, a lower bridge turn-off signal, or a lower bridge turn-off enable signal.

15. The electric vehicle of claim 14, wherein the switches comprise at least one first switch and at least one second switch, wherein the inverter further comprises:

an upper bridge arm comprising the at least one first switch; and a lower bridge arm comprising the at least one second switch, wherein the drive chips comprise:

at least one first drive chip corresponding to the at least one first switch; and at least one second drive chip corresponding to the at least one second switch, and wherein the drive logic circuit comprises:

an upper bridge drive logic circuit connected to the at least one first drive chip and configured to:

generate at least one first drive control signal of the drive control signals and at least one first enable signal of the enable signals based on the PWM signals, the first signal, and the second signal; and output the at least one first drive control signal and the at least one first enable signal to the at least one first drive chip; and a lower bridge drive logic circuit connected to the at least one second drive chip and configured to:

generate at least one second drive control signal of the drive control signals and at least one second enable signal of the enable signals based on the PWM signals, the first signal, and the second signal; and output the at least one second drive control signal and the at least one second enable signal to the at least one second drive chip.

16. The electric vehicle of claim 15, wherein the upper bridge drive logic circuit is further configured to:

further generate the at least one first enable signal in response to the second signal or an upper bridge enable signal; and further generate the at least one first drive control signal based on the second signal, the upper bridge turn-off signal, and at least one PWM signal of the PWM signals and corresponding to the at least one first switch.

17. The electric vehicle of claim 15, wherein the lower bridge drive logic circuit is further configured to:

further generate the at least one second enable signal in response to the second signal or the lower bridge turn-off signal; and further generate the at least one second drive control signal based on the second signal, the lower bridge turn-off signal, and at least one PWM signal of the PWM signals and corresponding to the at least one second switch.

18. The electric vehicle of claim 15, wherein the upper bridge drive logic circuit comprises at least one first logic circuit respectively corresponding to the at least one first switch, and wherein the lower bridge drive logic circuit comprises at least one second logic circuit respectively corresponding to the at least one second switch.

19. The electric vehicle of claim 15, wherein the upper bridge drive logic circuit comprises:

a first AND gate circuit comprising:

a first input end connected to the control chip;

a second input end connected to the watchdog chip; and a first output end connected to the at least one first drive chip;

a second AND gate circuit comprising:

a third input end connected to the control chip;

a fourth input end connected to the watchdog chip; and a second output end;

a first OR gate circuit comprising:

a fifth input end connected to the second output end;

a sixth input end connected to the control chip; and a third output end connected to the at least one first drive chip;

a second OR gate circuit comprising:

a seventh input end connected to the second output end;

an eighth input end connected to the control chip; and a fourth output end connected to the at least one first drive chip; and a third OR gate circuit comprising:

a ninth input end connected to the second output end;

a tenth input end connected to the control chip; and a fifth output end connected to the at least one first drive chip.

20. The electric vehicle of claim 15, wherein the lower bridge drive logic circuit comprises:

a phase inverter comprising:

a first input end connected to the watchdog chip; and a first output end;

an AND gate circuit comprising:

a second input end connected to the control chip;

a third input end connected to the watchdog chip; and a second output end;

a first OR gate circuit comprising:

a fourth input end connected to the first output end;

a fifth input end connected to the control chip; and a third output end connected to the at least one second drive chip;

a second OR gate circuit comprising:

a sixth input end connected to the second output end;

a seventh input end connected to the first output end; and a fourth output end;

a third OR gate circuit comprising:

an eighth input end coupled to the fourth output end;

a ninth input end connected to the control chip; and a fifth output end connected to the at least one second drive chip;

a fourth OR gate circuit comprising:

a tenth input end coupled to the fourth output end;

an eleventh input end connected to the control chip; and a sixth output end connected to the at least one second drive chip;

a fifth OR gate circuit comprising:

a twelfth input end coupled to the fourth output end;

a thirteenth input end connected to the control chip; and a seventh output end connected to the at least one second drive chip.

\* \* \* \* \*